United States Patent [19]

Austin

[11] 4,163,535

[45] Aug. 7, 1979

[54] UNMANNED MULTIMODE HELICOPTER

[75] Inventor: Reginald G. Austin, Brent Knoll, Nr. Highbridge, England

[73] Assignee: Westland Aircraft Limited, Yeovil, England

[21] Appl. No.: 314,494

[22] Filed: Dec. 13, 1972

[30] Foreign Application Priority Data

Dec. 13, 1971 [GB] United Kingdom ............... 57794/71

[51] Int. Cl.² .............................................. B64C 27/10
[52] U.S. Cl. .............................. 244/17.23; 244/17.11; 244/17.17
[58] Field of Search ............... 244/17.11, 17.13, 17.15, 244/17.17, 17.19, 17.23, 17.25

[56] References Cited
U.S. PATENT DOCUMENTS

| 2,551,455 | 5/1951 | Neale ................................. 244/17.11 |
| 3,116,040 | 12/1963 | Petrides et al. ................... 244/17.13 |
| 3,122,098 | 2/1964 | Glennan ............................. 102/49.5 |
| 3,226,059 | 12/1965 | Paterson et al. .................. 244/17.17 |
| 3,337,161 | 8/1967 | Halton ................................ 244/3.14 |
| 3,542,317 | 11/1970 | Irby .................................... 244/17.17 |
| 3,611,367 | 10/1971 | Billottet et al. ................... 244/17.15 |

FOREIGN PATENT DOCUMENTS

| 913036 | 12/1962 | United Kingdom ................... 244/17.17 |
| 1116164 | 6/1968 | United Kingdom ................... 244/17.25 |

*Primary Examiner*—Verlin R. Pendegrass
*Attorney, Agent, or Firm*—Larson, Taylor and Hinds

[57] ABSTRACT

An unmanned helicopter capable of controlled free flight comprises a plurality of separable modules arranged in a substantially vertically stacked assembly symmetrical about a vertical axis. The modules include an uppermost propulsion module, a central fuel tank module and a lowermost control and payload module.

7 Claims, 10 Drawing Figures

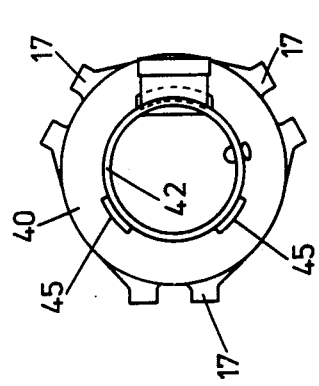
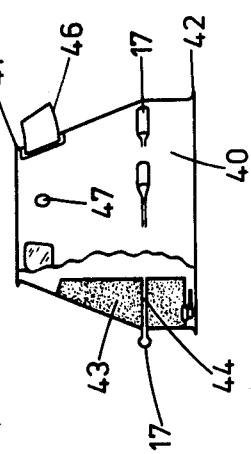
FIG. 5A.
FIG. 5B.
FIG. 5.

UNMANNED MULTIMODE HELICOPTER

This invention relates to helicopters, and more particularly to helicopters capable of unmanned free flight.

According to the invention I provide a helicopter comprising a plurality of separable modules arranged in a substantially vertically stacked assembly.

The invention will now be described by way of example only and with reference to the accompanying drawings, in which.

Figure 1:
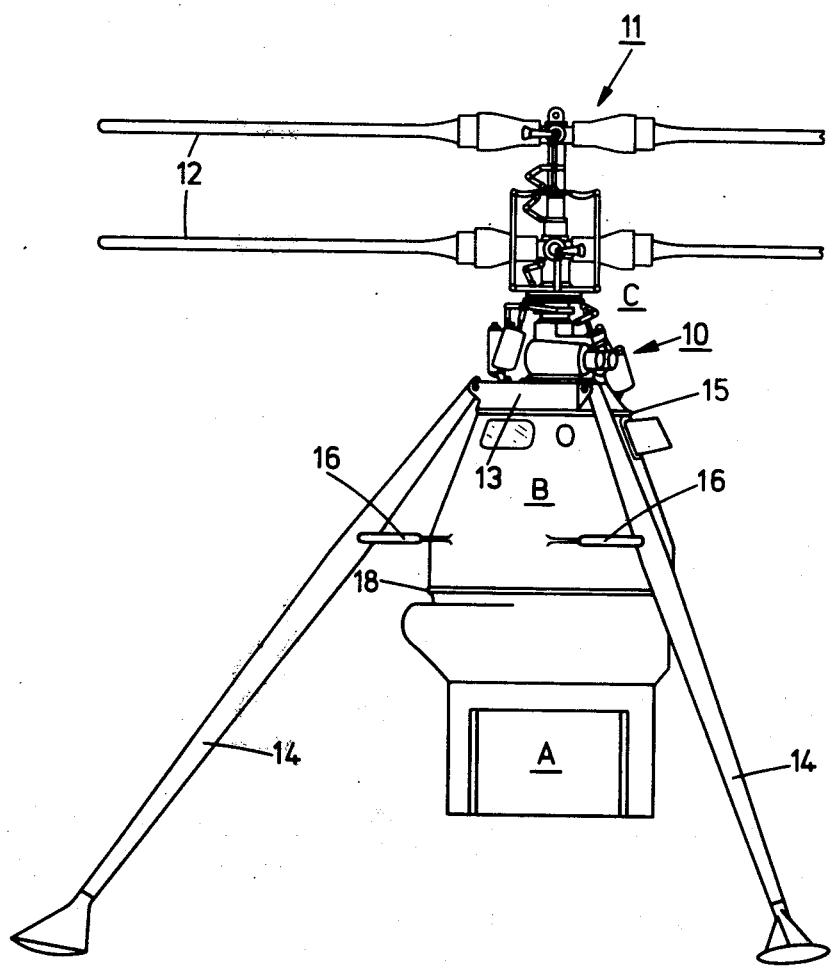
FIG. 1 is a side view of a preferred embodiment of the invention.
Figure 2:
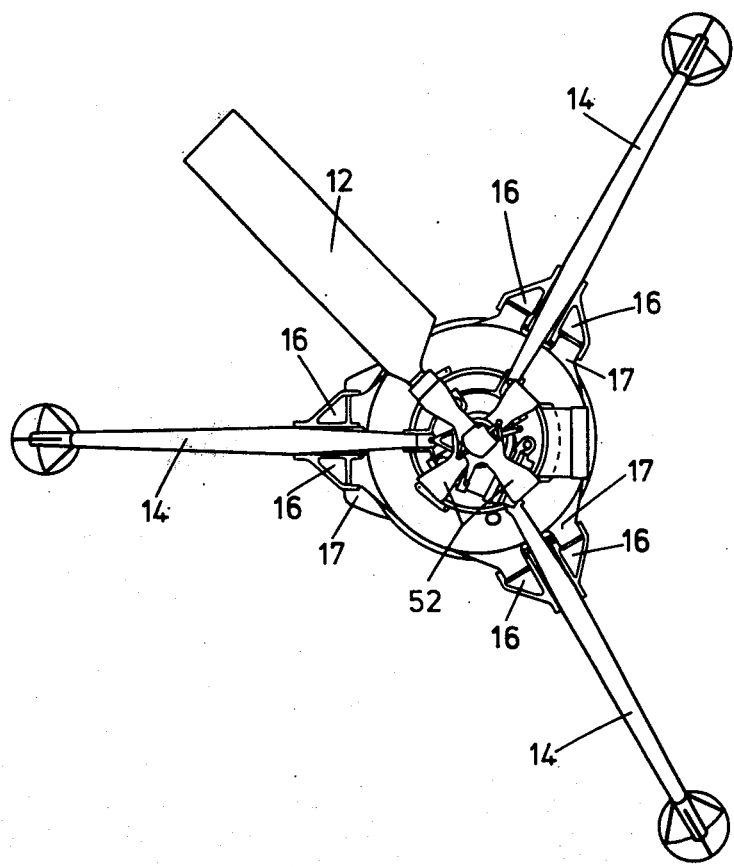
FIG. 2 is a plan view of the aircraft of FIG. 1.

Referring now to FIG. 1, a helicopter according to a preferred embodiment of the invention is generally indicated at 10 and consists of three basic modules, A, B and C. The modules are clearly shown in the exploded view in FIG. 3 and comprise a propulsion module (module C), a fuel tank module (module B) and a control and payload module (module A). Each module will hereinafter be described in detail with reference to FIGS. 4 to 9 inclusive.

Returning now to the general configuration of the helicopter 10, it will be seen from FIG. 1 that the three modules are arranged in a substantially vertically stacked assembly, and are symmetrically arranged about a vertical axis. The uppermost module (module C) includes a rotor system 11 comprising two pairs of coaxially mounted contra-rotating rotor blades 12 driven by an engine and gearbox (not shown in FIG. 1) and mounted on a collar 13. The upper ends of three supporting legs 14 forming a tripod undercarriage are pivotally mounted and equispaced around the collar 13.

The fuel tank module (module B) is attached to the lowermost surface of the collar 13 by a quick release V-band coupling 15. One end of a pair of links 16 are attached to each of three lugs 17 formed on the casing of module B, the other ends of each pair of links are attached to the legs 14 in their operational position.

The control and payload module (module A) is attached to the lowermost surface of module B by a quick release V-band coupling 18. Module A comprises two readily separable submodules $A_1$ and $A_2$ (FIG. 3), $A_1$ representing the payload area and $A_2$ comprising a control assembly. $A_2$ is attached directly to module B.

Module A (FIGS. 6 to 9 inclusive).

In the particular embodiment of the invention shown and described in this specification sub-module $A_1$ of module A is fitted with photographic equipment to facilitate operation of the helicopter in a surveillance role. However, it is to be understood that the invention is not limited to this configuration and that the sub-module $A_1$ can be utilized in many ways. Interchangeable units could be provided to enable the helicopter to operate in a number of roles.

Figure 7:
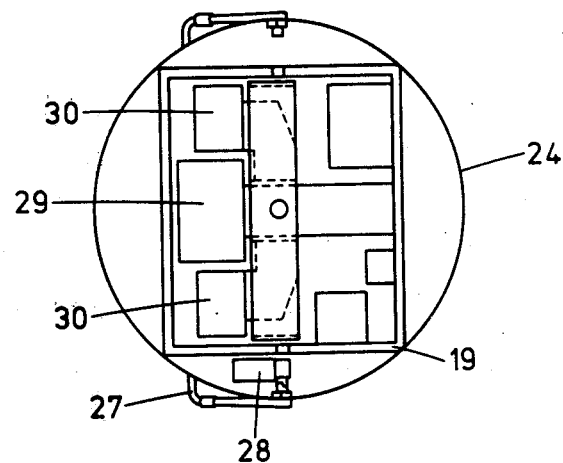
Figure 6:
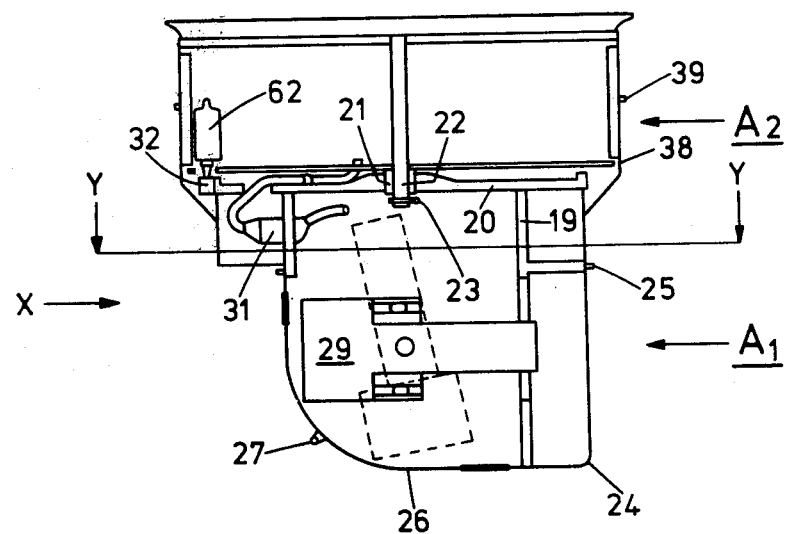
Figure 9:
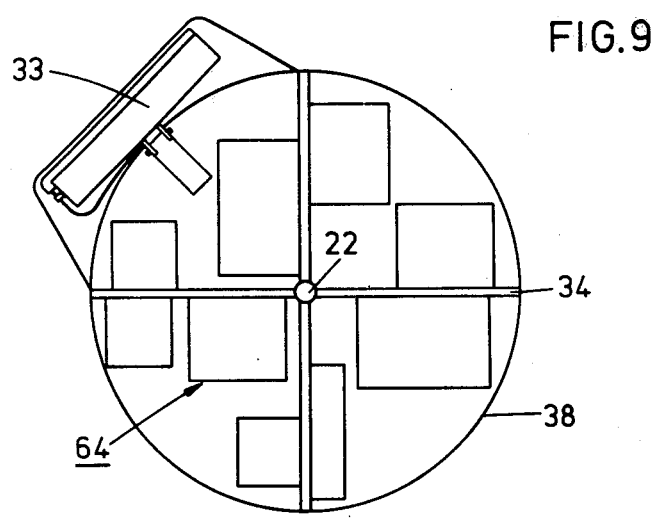
Figure 8:
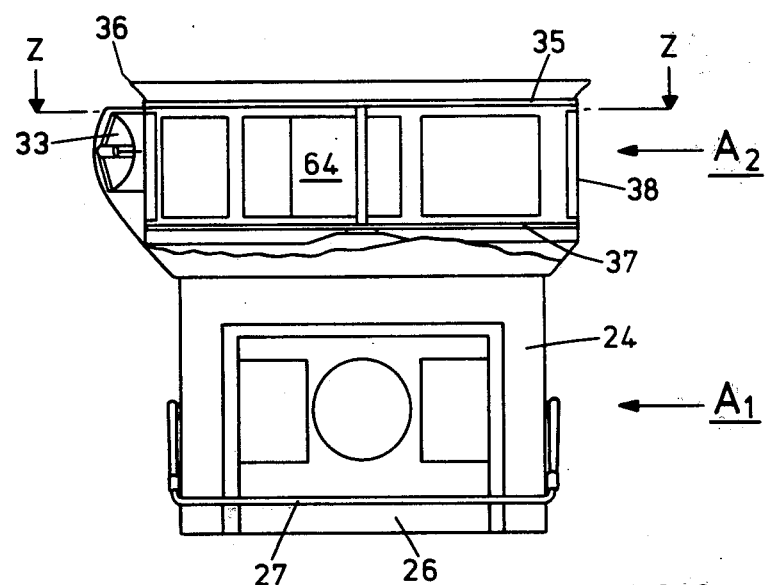

In FIGS. 6 to 9 details of the sub-modules $A_1$ and $A_2$ are shown as follows:

FIG. 6 is a part sectional side view showing constructional details and equipment in sub-module $A_1$, FIG. 7 is a plan view of sub-module $A_1$ taken on lines Y—Y of FIG. 6 showing one proposed layout of the equipment, FIG. 8 is a part sectional side view taken on arrow X of FIG. 6 showing details of equipment in sub-module $A_2$, and FIG. 9 is a plan view taken on line Z—Z of FIG. 8 showing one proposed layout of the equipment in sub-module $A_2$.

Sub-module $A_1$ (FIGS. 6 and 7) comprises a box-shaped sandwich structure 19 of glass reinforced plastic material depending from a circular diaphragm 20 of similar construction. A bearing 21 is mounted centrally of the diaphragm 20 to facilitate rotation of sub-module $A_1$ about a central axle 22 which serves also to provide attachment of sub-module $A_1$ by a quick release pin 23. A glass reinforced plastic external cover 24 is secured to the structure by quick release pins 25, and the cover 24 includes a window section 26 over which a windscreen wiper 27 is operable by a motor and gearbox 28 (FIG. 7). An electrical de-icing/demisting element may be incorporated in the window 26. A television camera 29 and two still cameras 30 are gimbal mounted in the structure together with suitable control and elevation units. Electrical connection is by a quick release coupling 31 mounted on the structure 19. Rotation of sub-module $A_1$ is accomplished by a motor 62 (mounted in sub-module $A_2$) driving a gear wheel 32 which is maintained in contact with the perimeter of the diaphragm 20.

Sub-module $A_2$ (FIGS. 8 and 9) is an electronics package including an antenna 33, various control units for the photographic equipment, and electronic control and autostabilizing units generally indicated at 64 necessary to operate the helicopter controls to ensure efficient operation of the helicopter by signals transmitted from a remote location. The units are mounted on a basically cruciform sandwich structure 34 of glass reinforced plastic material mounted below a diaphragm 35 of similar construction and incorporating a V-band clamp ring 36 for attachment to module B. A further diaphragm 37 is provided to stabilize the lower extremities of the cruciform structure 34. The filler material, especially of diaphragm 35, may be of expanded p.v.c. foam, because of its insulating and damping qualities. The cruciform structure 34 is built up around a tube whch provides the axle 22 for sub-module $A_1$ and also a conduit for a possible warm air bleed from the engine compressor to the interior of module $A_1$. An outer cylindrical skirt 38 is secured around the periphery of the sub-module $A_2$ by quick release pins 39, and extends downwardly to cover the uppermost edge of sub-module $A_1$ (see also FIG. 6).

Module B (FIG. 5).

In FIG. 5, details of the fuel tank module (module B) are shown as follows:

FIG. 5A is a part sectional side elevation, and

FIG. 5B is a plan view.

Figure 3:
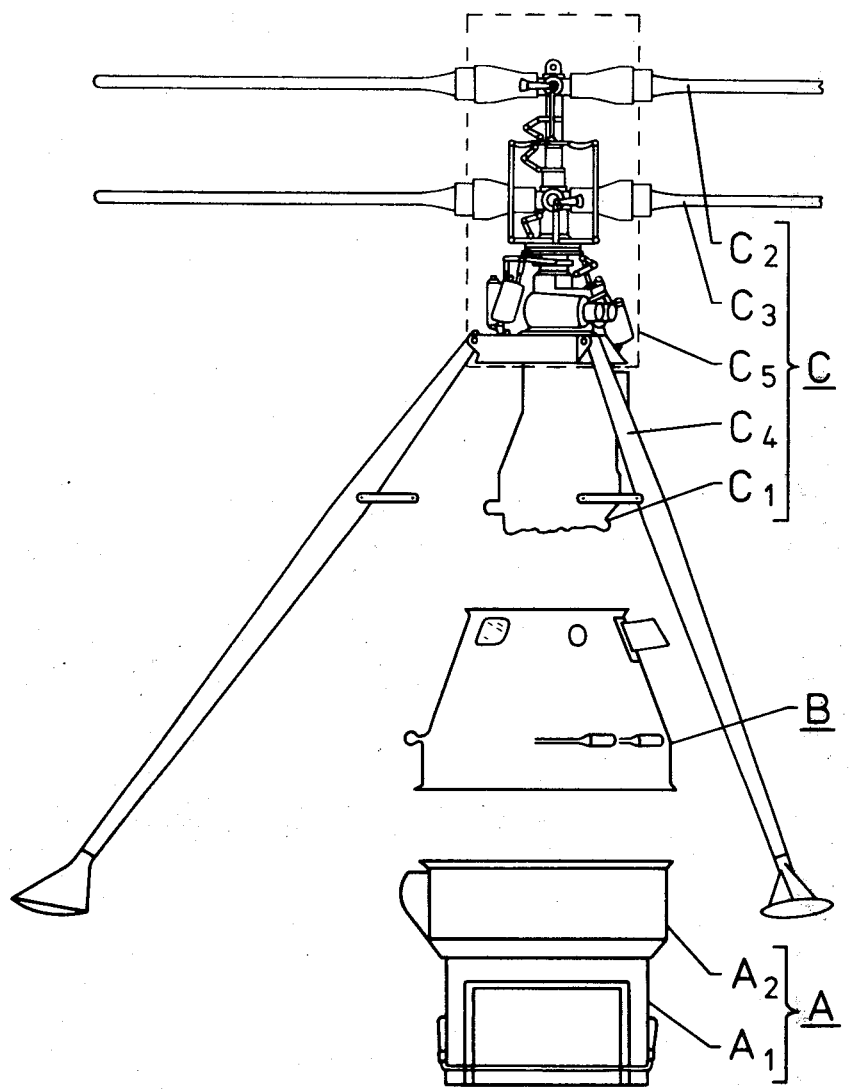
FIG. 3 is an exploded side view showing the modular type construction of the preferred embodiment, and FIGS. 4 to 9 inclusive are detail views of the modules used in the construction of a preferred embodiment.

This module consists of a generally truncated conical lightweight glass reinforced plastic casing 40 terminating in upper and lower V-band couplings 41 and 42 for attachment to the collar 13 and module A respectively (FIGS. 1 and 3). When assembled, module B provides a housing for an engine (part of module C), this being facilitated by an annular fuel tank 43 formed integral with the casing. An inner wall of the fuel tank 43 is stabilized by a horizontal diaphragm 44 which also provides support for the landing gear attachment lugs 17. Two engine air intakes 45 are provided at the top of the casing 40 together with an exhaust outlet 46 and a fuel filler cap 47. In a modification of the fuel tank module, three exhaust outlets 46 are equispaced in the casing 40 and connected to a trifurcated duct system within the casing.

Figure 4:
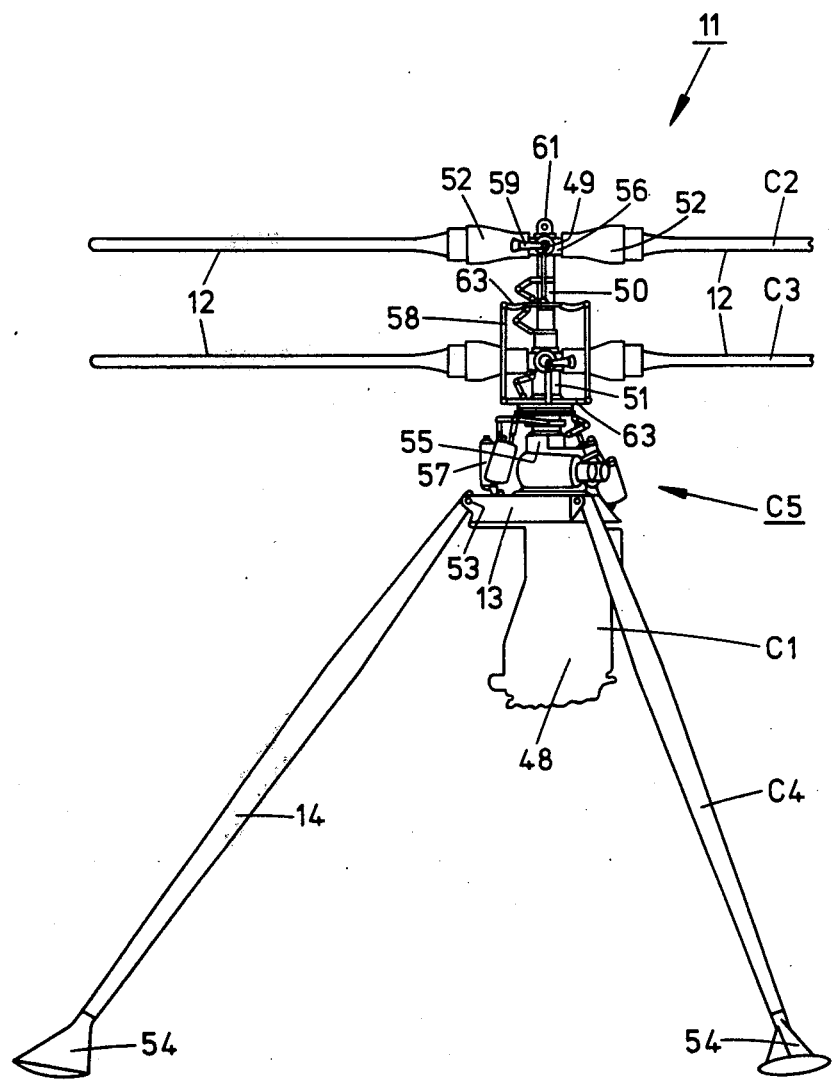

Module C (FIG. 4).

The propulsion module consists of five sub-unites, namely:

$C_1$—Power unit
$C_2$—Upper rotor blades
$C_3$—Lower rotor blades
$C_4$—Tripod
$C_5$—Mechanical unit.

Sub-unit C1

An engine 48 is mounted in a vertical attitude by means of a V-band clamp to a flange incorporated in the base of the collar 13. During operation the engine is aspirated through a plenum chamber formed by the annular fuel tank 43 in module B (refer to FIG. 5). The engine air enters through the two intakes 45 at the top of the module and flows over the engine 48 to provide engine cooling. Some of this air is bled to atmosphere using the ejector effect of an exhaust gas stream to assist engine bay ventilation. Module B is effective also to minimize propagation of compressor noise and as a heat baffle to minimize direct radiation from the engine. Incorporation of the trifurcated exhaust system previously described in relation to Module B provides important operational advantages by greatly improving the dispersal of exhaust gases. The cooling airflow can be modified by providing a symmetrical casing extending upwardly from below the air intakes 45 in Module B (FIG. 5), the casing extending upwardly to terminate in an aperture located beneath the lower swashplate 63 (sub-unit $C_5$). This modification means that an airflow is induced through the aperture to provide cooling for the electrical control units 57 and the gearbox 55 as well as the engine 48. The casing also serves to protect the control units 57.

Sub-units C2 and C3

Sub-units $C_2$ and $C_3$ form part of the rotor system 11 and comprise an upper ($C_2$) and a lower ($C_3$) pair of rotor blades 12 which form a handed set. The pairs of blades are mounted about central pivotal mountings 49 through radially extending hub members 56, for rotation in opposite directions by two coaxially arranged rotor shafts 50 and 51 respectively, driven from a gearbox (part of sub-unit $C_5$). Each rotor blade is mounted for pivotal movement about its longitudinal axis by feathering bearings located in housings 52. The construction of one suitable form of rotor blade and attachment means is described and claimed in our U.S. Pat. No. 3,810,713.

Sub-unit C4

Sub-unit $C_4$ comprises the tripod undercarriage and includes the three identical legs 14. Each leg extends downwardly and outwardly from pivotal connections 53 equispaced around the collar 13, and terminates in saucer-shaped ground reaction feet 54 providing a relatively large ground base triangle for good stability. The legs are constructed of glass reinforced plastic material in a tubular configuration of constant wall thickness tapering towards each end. Local reinforcement is provided at the attachment points and the feet.

Sub-unit C5

This unit comprises a gearbox, rotor hub, controls and accessories and the collar 13.

Gearbox

A gearbox 55 is mounted directly on the engine 48 in a vertical position. This results in a relatively simple transmission layout requiring only five primary gears to provide the required reduction to the two contra-rotating rotor shafts 50 and 51. Case hardened and ground steel spur gears are used for minimum weight and space, each power path comprising a pinion and wheel pair with the addition of an idler gear to reverse the direction of rotation of one rotor shaft. Conventional lightweight roller bearings are used throughout.

The lubrication system is self-contained within the gearbox. Oil is pumped from a sump to upper rotor shaft bearings from where it flows by gravity back to the sump through the gears and bearings to provide the necessary lubrication and cooling. Oil cooling is by convection through the casing.

Rotor hub, controls and accessories

As previously described in relation to sub-units $C_2$ and $C_3$, each pair of rotor blades is mounted about a central hinge 49 in each rotor hub member 56 to provide what is known as teetering rotor assemblies. A torsion unit is located in each hinge 49 to provide restraint.

A swash plate 63 is located under each pair of rotors. Three electric units 57 with linear output control are connected by jacks to the lower swash plate 63 to impart collective and differential pitch control movements to the lower pair of rotor blades $C_3$. This movement is reproduced in the upper pair of rotor blades $C_2$ through linkage rods 58 connected to the upper swash plate 63. Pitch control arms 59 are connected to their respective swash plates 63 and bearings are suitably positioned to permit freedom of rotation for the relevant controls to each hub. Yaw control is provided by applying differential collective pitch. Independent collective pitch control to the lower rotor arm can be applied through a split path linkage system, actuated by a fourth electric jack.

A disc type rotor brake is mounted on the side of the gearbox and is driven by bevel gears mounted on the idler gear layshaft. An electric actuator operates the brake through a mechanical linkage remotely controlled to stop the rotors against ground idle engine power. A safety trip is mounted at the top of the tripod to prevent inadvertent operation of the brake in flight. This is designed to close the brake control circuit when contact is made with the ground on landing.

The primary electric supply is obtained from a gearbox mounted generator which is belt driven from a pulley mounted on an extension of the shaft of the brake disc. The helicopter control units are electrically connected to the various electronic control units previously described in sub-module $A_2$.

Collar

The collar 13 forms the base of the gearbox 55 and houses the lower main shaft and input shaft bearings. It also forms the pick-up for the legs 14, the flight control and rotor brake actuators, the mounting flange for the engine 48 and a flange 60 from which the module stack is suspended.

It is clear, therefore, that the whole of the lift, landing and flight loads are concentrated in the collar 13 and it is envisaged that a high quality light alloy forging will be used.

In a modification of the arrangement of the parts of subunit $C_5$, the gearbox 55 is replaced by a unit located beneath the collar 13, the collar 13 being extended upwardly in the shape of a truncated cone to provide a mounting for lift bearings. The extended collar 13 may also be utilized to provide a reservoir for lubricating oil for the gearbox and engine.

OPERATION

The co-axial rotor configuration of the helicopter permits unhanded symmetrical control which has advantages in that the antenna 33 (FIG. 8) can be fixed to the body, the helicopter flying equally well in all yawed attitudes with the antenna linked to base.

The following rotor control functions are provided on the vehicle:

(1) Forward cycle pitch for speed control,
(2) Lateral cyclic pitch for roll control,
(3) Collective pitch for climb and descent,
(4) Differential collective pitch for yaw control, together with the following engine controls:
  (1) Start/stop,
  (2) Ground idling,
  (3) Flight r.p.m.

Autostabilization is provided in both the roll and pitch axes, in addition to stabilization in the yaw axis which is demanded by the telecommunications, thus leaving the operator free from routine control problems and required only to direct the flight path. An engine constant speed unit is incorporated and is linked to the inertia of the rotor, and other flight control equipment such as an auto-pilot, timer, radio altimeter, programmer, gyro compass and height hold, can be incorporated if required. A self-destruct facility can also be provided.

In the particular embodiment described, controls are also provided on the vehicle (in sub-module $A_2$) for operating the television and still cameras, the windscreen wiper and a possible control in elevation of the antenna for operation near a base from which all control signals are transmitted for controlling the helicopter and its equipment in flight.

The purpose of the base ground control is to control the flight of the helicopter and to interpret information transmitted from the helicopter and displayed for instance on a television screen and a positional reference grid. The flying controls necessary at base will, therefore, include the following:

(1) Cyclic control stick on a spherical mount,
(2) Collective control stick,
(3) Engine r.p.m. selector,
(4) Height selection and switch.

It is, therefore, within the capabilities of one operator to handle a complete mission, including camera controls, of the helicopter according to the present invention.

Ground equipment, handling and maintenance

A ground station for operating the helicopter includes the control console and an antenna and air power supplies. The antenna is steerable and capable of rapid and easy stowage and extension. A stabilizer is installed for the power supplies which may be obtained from a ground vehicle, its batteries or from a separate source. An observation post may be desirable, but in the case of the embodiment described, take-offs and landings can be viewed by use of the television display.

A landing pad comprising a square mat of either light alloy, plastic or wood is desirable both as a hard stand for the vehicle and as a maintenance platform.

The ground equipment can be incorporated in a land vehicle which may be adapted to carry one or more helicopters either on or within the structure. To accomplish this the rotor blades are either readily removable or foldable, and by removal of the upper pivotal connection to the collar 13, the legs 14 can be folded about the links 16 to a substantially vertical position adjacent the stacked modular assembly. Lifting gear is provided on the vehicle and an eye bolt 61 (FIG. 4) is provided at the top of the rotor shaft on the helicopter.

Maintenance of the helicopter hereinbefore disclosed is readily accomplished at a convenient working height by virtue of the modular construction employed involving three basic modules which can be readily separated by means of quick release mechanical and electrical fittings. Removal and replacement of the modules can be accomplished without special equipment and, by removal of modules A and B, the engine and transmission is exposed to allow-in-situ maintenance. Servicing of equipment in sub-modules $A_1$ and $A_2$ is possible in-situ without disassembly of the modules, by removal of the quick release pins 25 and 39 and removal of the cover 24 and skirt 38 respectively (FIG. 6).

It will be apparent, therefore, that the present invention provides an unmanned helicopter capable of free flight which is relatively simple to operate and maintain. Where possible all structure is in glass reinforced plastic materials. All flight and landing loads are transferred to the collar 13, the vertical energy of the landing vehicle being fully absorbed by the undercarriage without exceeding the design factor of the airframe, which implies certain maximum values of ground reaction associated with vertical undercarriage deflection and absorbed energy. These requirements are provided by the elastic bending of the legs 14, giving the vertical deflection and strain energy absorption necessary for an unmanned vehicle. When the undercarriage deflects vertically there is a corresponding horizontal movement which provides some damping as the foot scuffs over the ground, further damping being obtained from hysteresis of the glass reinforced plastic material. Therefore, total damping is sufficient to prevent excessive recoil of the vehicle under normal operating conditions.

A further important feature is the location of the payload module (sub-module $A_1$) which is located symmetrically at the bottom of the stacked assembly and is easily replaceable for operation in different roles. This is particularly advantageous in the surveillance role associated with the embodiment hereinbefore described, in that an excellent "down and around" field of vision is possible, and also that the functioning of the equipment is not impaired by having to view through either a rotor disc or engine exhaust gases. Other possible roles facilitated by the versatility provided by the modular construction employed include the carriage of rockets, flares and markers.

Although one embodiment of the invention has been described and illustrated, it is to be understood that modifications can be made without departing from the scope of the appended claims. Several such modifications are described in the foregoing description in relation to Module B and sub-units $C_1$ and $C_5$ of Module C.

I claim as my invention:

1. A helicopter comprising in combination,
   a plurality of separable modules arranged in a substantially vertically stacked assembly,
   the modules including an uppermost propulsion module, a central fuel tank module and a lowermost control and payload module, a collar supporting the propulsion module, attachment means on said collar and suspending the fuel tank module, a tripod undercarriage means attached to and equi-spaced around the collar, said tripod means comprising three legs extending downwardly and outwardly, whereby during operation, all flight and landing loads are transferred to said collar.

2. A helicopter as claimed in claim 1, wherein each undercarriage leg is constructed of glass reinforced plastics material in a tubular configuration of constant wall thickness and tapering towards each end.

3. A helicopter as claimed in claim 1, wherein the propulsion module comprises a co-axial contra-rotating rotor system and an engine and gearbox for driving said rotor system, the engine being suspended from the collar, the propulsion module further including control means for effecting cyclic, collective and differential collective pitch changes of the rotor system.

4. A helicopter as claimed in claim 1, wherein the fuel tank module comprises a casing of generally truncated cone shape having an annular fuel tank arranged to surround the engine when the module is suspended from the collar, and having attachment means from which the control and payload module is suspended.

5. A helicopter as claimed in claim 3, wherein the control and payload module comprises an upper control sub-module and lower payload sub-module, the upper control sub-module containing electronic control units for operating said control means of the propulsion module and an externally mounted antenna for transmitting control signals from a ground station.

6. A helicopter as claimed in claim 5, wherein gimbal mounted television and still cameras are disposed in the lower payload sub-module and said cameras operative through a window section and control means in the upper control sub-module for controlling said cameras and means for rotating the payload sub-module about a generally vertical axis.

7. An unmanned free-flying helicopter comprising in combination, a plurality of separable modules arranged in a substantially vertically stacked assembly, the modules including an uppermost propulsion module, a central fuel tank module and a lowermost control and payload module, a collar arranged to support the propulsion module and attachment means on said collar for suspending the fuel tank module, the propulsion module comprising a co-axial contra-rotating rotor system, an engine and gearbox for driving said rotor system, the engine being suspended from the collar, the propulsion module further including control means for effecting cyclic, collective and differential collective pitch changes of the rotor system, the fuel tank module comprising a casing of generally truncated cone shape having an annular fuel tank arranged to surround the engine when the module is suspended from the collar, and having attachment means from which the control and payload module is suspended, the control and payload module comprising an upper control sub-module and a lower payload sub-module, the control sub-module containing electronic control units for operating said control means of the propulsion module and an externally mounted antenna for transmitting control signals from a ground station, the payload sub-module containing television and still cameras operative through a window section and control means in the upper control sub-module for controlling said cameras, a tripod undercarriage means attached to and equi-spaced around the collar, said tripod means comprising three legs extending downwardly and outwardly, whereby during operation, all flight and landing loads are transferred to the collar.

* * * * *